C. H. KNAPP.
CONVEYER.
APPLICATION FILED MAY 11, 1908.
No. 900,554. Patented Oct. 6, 1908.
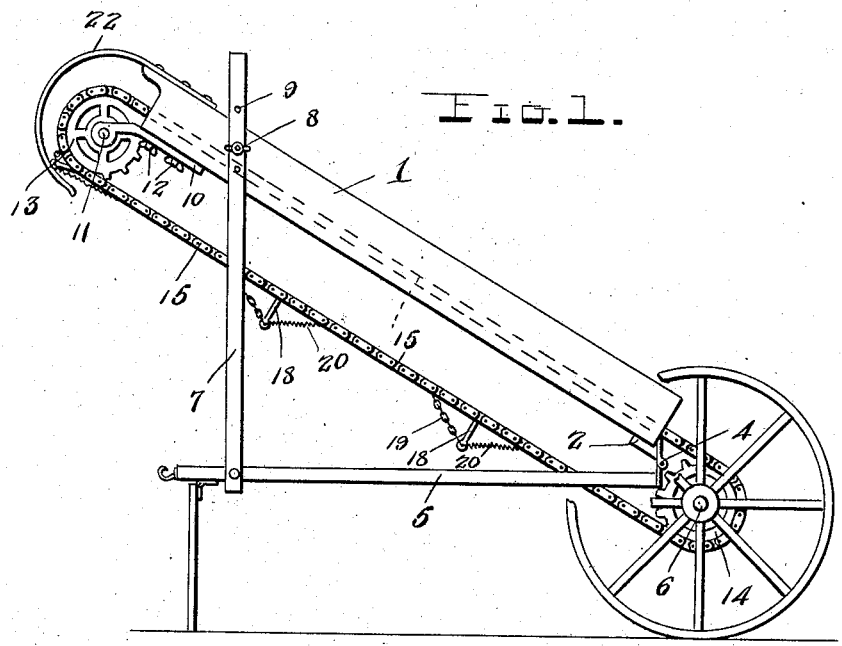
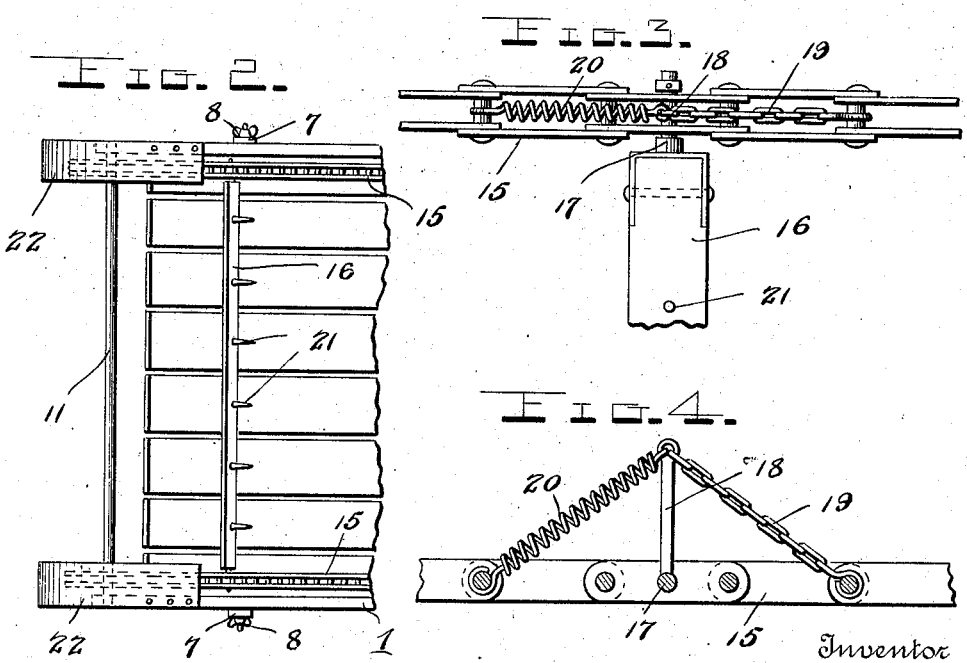
Witnesses
Chas. L. Griesbauer
C. H. Griesbauer
Inventor
Charles H. Knapp.
By H. B. Willson & Co.
Attorneys

UNITED STATES PATENT OFFICE.

CHARLES H. KNAPP, OF CHICAGO, ILLINOIS.

CONVEYER.

No. 900,554.  Specification of Letters Patent.  Patented Oct. 6, 1908.

Original application filed January 6, 1908, Serial No. 409,509. Divided and this application filed May 11, 1908.
Serial No. 432,091.

*To all whom it may concern:*

Be it known that I, CHARLES H. KNAPP, a citizen of the United States, residing at Chicago, in the county of Cook and State of Illinois, have invented certain new and useful Improvements in Conveyers; and I do declare the following to be a full, clear, and exact description of the invention, such as will enable others skilled in the art to which it appertains to make and use the same.

My invention relates to conveyers and especially to that type used in connection with hay rakes and elevators.

This invention is the division of my co-pending application, Serial No. 409,509 filed January 6, 1908, and especially relates to the conveyer mechanism shown therein, whose object is to carry the hay to the point of discharge and forcibly discharge it therefrom so that no material will cling to the tine of the conveyer and be carried back to its starting point.

A further object of the invention is the provision of means for resiliently supporting the tines, whereby rigid obstructions will be prevented from breaking them.

With these and other objects in view, the invention consists of certain novel features of construction, combination and arrangement of parts, as will be more fully described and particularly pointed out in the appended claims.

In the drawings, Figure 1 is a side elevation of the conveyer supported upon wheels and with its forward end held elevated by a truss member; Fig. 2 is a longitudinal sectional view thereof; Fig. 3 is a detail top plan view; and Fig. 4 is an enlarged sectional view taken on the line 4—4 of Fig. 3.

The elevator or conveyer comprises side members 1 which are connected at their lower ends by cross-slats 2, to which the hinges 4 are connected so as to support the device upon the arms 5. These arms have a pair of rearwardly extending brackets in which the supporting axle 6 is journaled, and at their forward ends are provided a pair of uprights or standards 7, which are connected to the arms and adjustably connected to the side members by means of set screws 8 carried by the side members and adapted to enter any one of a plurality of apertures 9, formed in the upper part of the standards. The upper end of the side members are provided with a pair of adjustable brackets 10, in which the sprocket shaft 11 is journaled and these brackets are preferably slotted to receive a pair of set screws 12. Secured to the sprocket shaft 11 is a pair of separated sprocket wheels 13, which correspond with a pair of similar sprocket wheels 14 carried upon the main supporting axle 6. These sprocket wheels receive the chains 15, and are driven in any suitable manner, here shown as through the main driving axle 6. The chains are connected by suitable cross-slats 16 which have connected therein suitable stub shafts 17 which pass through the links of the chain and carry upwardly extending arms 18, which are attached on one side to one of the links of the chain by a suitable inflexible connection thereto, such as a chain 19 and on the other side to a link in the chain by a spring 20. These slats carry suitably disposed tines 21 which project upwardly from the slats and suffice to hold the hay upon the conveyer, as will be hereinafter described.

Projecting from the outer end of each side member 1 are suitably curved arms 22, to over hang the arms 18, and are adapted to engage them to retract and turn the slats against the tension of the springs, as is shown in Fig. 1. When the arms 18 are released from the guiding arms 22, the slats 16 are snapped violently to normal position by the action of the springs 20, thus throwing any hay which may have become stuck to the tines 21 into a receptacle which is placed for receiving the same. Thus constructing the device, it will be seen that no excess hay adheres to the tines of the conveyer and that any obstruction which is encountered thereby will be passed over by reason of the flexible connection between the arms 18 and the conveyer chain.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. A device of the class described comprising an endless conveyer, grasping devices carried thereby, means to throw said devices out of normal position, and means to forcibly return them to normal position to disengage the material carried by the conveyer.

2. A device of the class described comprising an endless conveyer, cross slats carried thereby, means for axially rotating said slats out of normal position, and means to snap said slats to normal position to forcibly disengage the material carried by the conveyer.

3. A device of the class described comprising an endless conveyer, cross slats journaled in the conveyer chains, a rigid arm projecting from each of said slats, flexible connections between said arms and the conveyer chains, means to rotate said slats to throw them out of normal, and means connected to the arms and chains for snapping the slats back to normal whereby the material carried by the conveyer is forcibly disengaged.

4. In a device of the class described, a conveyer, cross slats carried thereby, stub shafts secured to the slats and journaled in the conveyer chains, a flexible connection between the conveyer chains and the stub shafts, and a resilient connection between the stub shafts and the conveyer chains which permits axial rotation of the slats.

5. In a device of the class described, a conveyer, cross slats carried thereby, stub shafts secured to the slats and journaled in the conveyer chains, a flexible connection between the conveyer chains and the stub shafts, a resilient connection between the stub shafts and the conveyer chains which permits axial rotation of the slats, and a pair of curved arms adapted to forcibly engage and rotate said slats.

6. In a device of the class described, a conveyer, cross slats carried thereby, stub shafts carried by the slats and journaled in the conveyer chains, arms carried by and projecting transversely from said shafts, flexible connections between said arms and the chains, springs connected at opposite ends to the arms and chains respectively, means to engage the arms to rotate the slats against the tension of said springs whereby when the arms are released the springs will snap the slats back to normal to forcibly disengage the material thereon.

In testimony whereof I have hereunto set my hand in presence of two subscribing witnesses.

CHARLES H. KNAPP.

Witnesses:
    JOHN M. MANGA,
    H. D. MACLEAR.